United States Patent [19]

Tokutomi

[11] 4,172,645
[45] Oct. 30, 1979

[54] DUAL PURPOSE FINDER DISPLAY FOR SINGLE LENS REFLEX CAMERA

[75] Inventor: Seijiro Tokutomi, Tokyo, Japan

[73] Assignee: Asahi Kogaku Kogyo Kabushiki Kaisha, Tokyo, Japan

[21] Appl. No.: 819,191

[22] Filed: Jul. 26, 1977

[30] Foreign Application Priority Data

Jul. 27, 1976 [JP]  Japan .................................. 51-100068

[51] Int. Cl.² ............................................. G03B 17/20
[52] U.S. Cl. ..................................................... 354/53
[58] Field of Search ......................... 354/53, 60 L, 289

[56] References Cited

U.S. PATENT DOCUMENTS 4,047,189  9/1977  Blitz et al. ......................... 354/53 X Primary Examiner—Michael L. Gellner
Attorney, Agent, or Firm—Sughrue, Rothwell, Mion, Zinn and Macpeak

[57] ABSTRACT

A finder display for both shutter speed and diaphragm priority modes in an SLR camera includes a liquid crystal or the like indicator cell 12 having closely side-by-side Tv and Av scales 13, 14 sharing in common the first E, OVER and UNDER characters 15, 16 and 17 and an illuminable dot indicator 18, such as an LED. The scales are longitudinally offset such that the number of laterally aligned numerals in both scales never exceeds four, which serves to further reduce the display width and its projection into the finder viewing field.

2 Claims, 8 Drawing Figures

FIG. 1 PRIOR ART
FIG. 2 PRIOR ART
FIG. 3 PRIOR ART
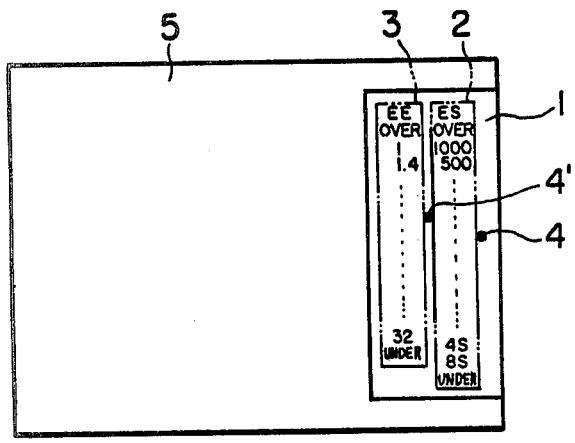
FIG. 4 PRIOR ART
FIG. 5 PRIOR ART
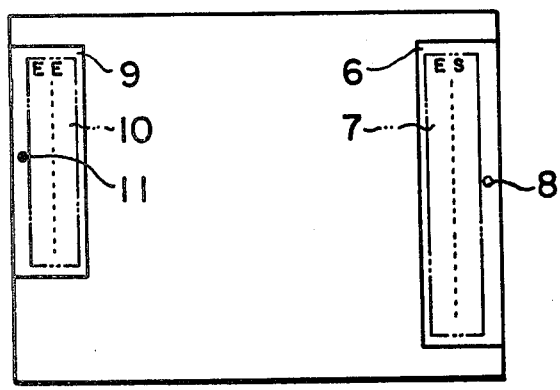
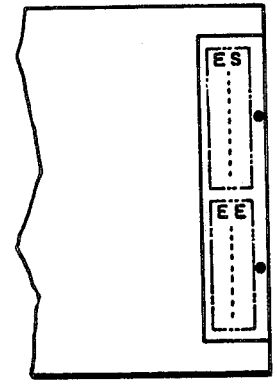

DUAL PURPOSE FINDER DISPLAY FOR SINGLE LENS REFLEX CAMERA

BACKGROUND OF THE INVENTION

This invention relates to a finder display for a single lens reflex camera wherein a shutter speed (Tv) scale and a diaphragm or aperture value (Av) scale are disposed side-by-side, and either one may be selectively illuminated.

As is well known, automatic exposure control systems in SLR cameras are generally of either the diaphragm priority (EE) type or the shutter speed priority (ES) type, and it is customary that the former displays the Av indication in the finder while the latter displays the Tv indication. Which type of indication is best suited for an automatic exposure control system cannot be stated previously as it is largely dependent upon the conditions of the photographic object and the photographer's intentions. A demand thus exists for a camera wherein the exposure control system can be changed over from the ES mode to the EE mode, and vice versa.

It is necessary for such a camera to display either the Tv indication or the Av indication in the finder, corresponding to the ES control mode or the EE control mode, and for implementing this function various types of electro-optical elements have been used. Prior to describing the present invention, several known display devices utilizing a light-transmissive type of liquid crystal cell will first be mentioned.

Referring to FIG. 1, a liquid crystal cell 1 bears a Tv scale 2 for the ES mode and an Av scale 3 for EE mode, each containing numerical graduations as shown in FIGS. 2 and 3. Reference numerals 4 and 4' designate LED indicators or the like for representing the Tv or Av ouputs of the exposure meter circuit, and 5 is the finder viewing field. Such an arrangement, wherein the Tv and Av scales are independent and each has its own indicator 4, 4', suffers from the drawbacks that: (1) the liquid crystal cell is unduly large; (2) it occupies too much of the finder viewing field area; and (3) the use of two indicators increases the number of terminals to be connected to a drive circuit.

Referring to the alternate arrangement shown in FIG. 4, a liquid crystal cell 6 containing a Tv scale 7 and a dot indicator 8 is disposed on the right side of the finder field, and a liquid crystal cell 9 containing an Av scale 10 and dot indicator 11 is disposed on the left side. With this device, however: (1) the area of the finder field is decreased, and since the two indicator cells are provided on opposite sides, handling difficulty results; and (2) the space for attaching the two cells as well as the space for their wiring is increased, thus requiring a larger and more costly camera body. The Tv and Av scales could be disposed in series as shown in FIG. 5, but this is impractical because the indicator numerals must be made to small for convenient use.

SUMMARY OF THE INVENTION

Briefly, and in accordance with the present invention, a finder display for both shutter speed and diaphragm priority modes in an SLR camera includes a liquid crystal or the like indicator cell having closely side-by-side Tv and Av scales sharing in common the first E, OVER and UNDER characters and an illuminable dot indicator, such as an LED. The scales are longitudinally offset such that the number of laterally aligned numerals in both scales never exceeds four, which serves to further reduce the display width and its projection into the finder viewing field.

BRIEF DESCRIPTION OF THE DRAWINGS

In the drawings:
FIG. 1 shows a prior art Tv-Av finder display arrangement utilizing a light-emissive liquid crystal cell;
FIG. 2 shows the contents of the Tv scale;
FIG. 3 shows the contents of the Av scale;
FIGS. 4 and 5 show further examples of prior art finder display arrangements.

DETAILED DESCRIPTION OF THE PREFERRED EMBODIMENT

Figure 6:
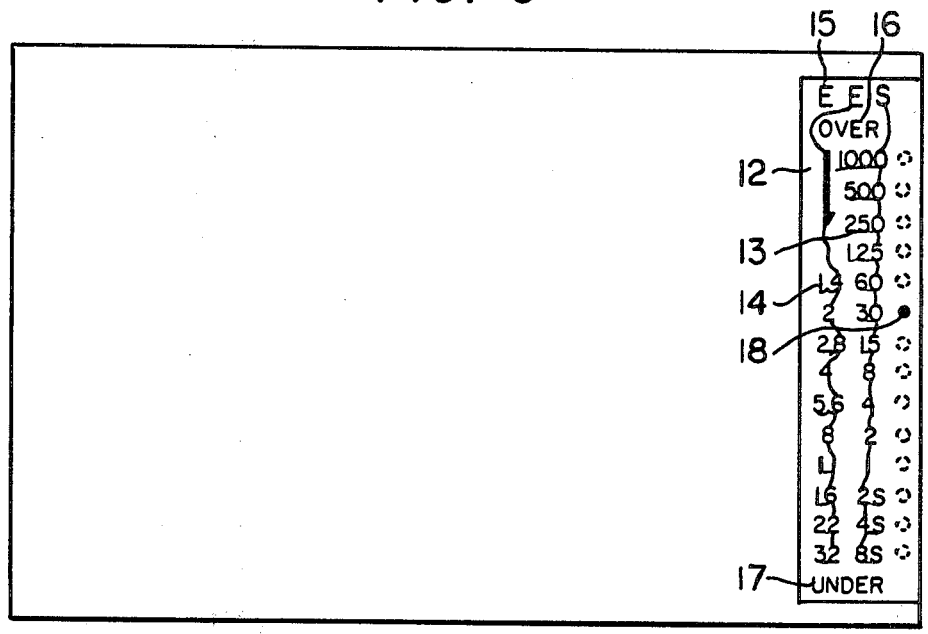
FIG. 6 shows a combined Tv-Av finder display arrangement according to the present invention.

Referring now to FIG. 6, a liquid crystal cell 12 includes a Tv scale 13 and an Av scale 14. The thin lines running down and connecting the numerals represent separate pattern electrodes for the Tv and Av scales. Reference numerals 15, 16 and 17 designate the "E", "OVER" and "UNDER" characters, which are inscribed on the cell substrate by printing or etching techniques, as fixed rather than liquid crystal indications, and 18 designates a dot indicator. With this arrangement: (1) the column of selectively energizable indicator dots is used in common for both the Tv display and the Av display; (2) the relative positions of the Tv and Av scales are offset, i.e., the numerals "1000" on the Tv scale and "1" on the Av scale are not aligned with each other, but are shifted such that, unlike the arrangement shown in FIG. 1, the number of laterally aligned numerals never exceeds four; and (3) the first "E", "OVER" and "UNDER" characters are fixedly inscribed and usable in common for both the Tv and Av displays.

Figure 7:
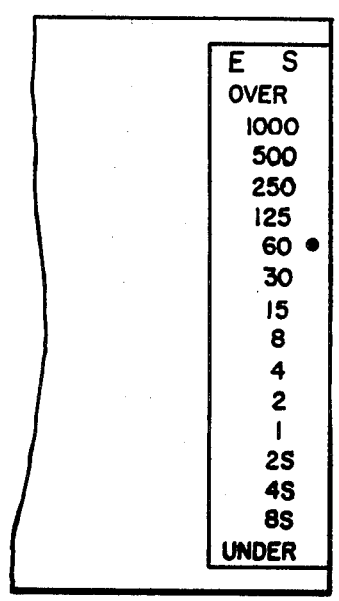
FIG. 7 shows the Tv scale in the ES control mode according to the present invention; and,
FIG. 8 shows the Av scale in the EE control mode according to the present invention.
Figure 8:
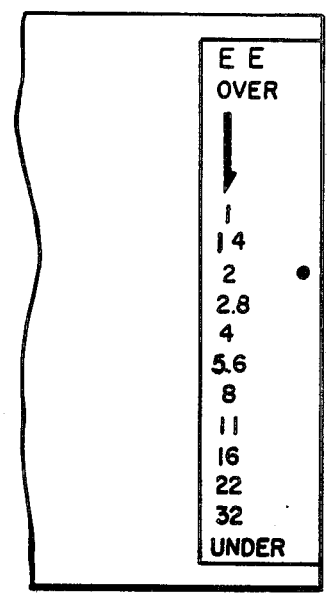

In the ES control mode a combination of the ES, OVER and UNDER characters, the Tv scale, and an energized dot indicator is shown in FIG. 7, and in the EE control mode a combination of the EE, OVER and UNDER characters, the Av scale, and an energized dot indicator is shown in FIG. 8. Although a light-transmissive liquid crystal cell has been shown as the electro-optical element, a reflection element or a light emitting element may also be used.

According to the present invention the numeral portion of the display is reduced in width, which results in a smaller overall cell which projects into the finder field to only a minimum degree. Further, the Tv and Av scales are disposed close together on the same side of the finder field, which results in easy and rapid reading by the photographer.

What is claimed is:
1. A finder display for a single lens reflex camera for selectively indicating either the exposure meter value of the shutter speed in a shutter speed priority control mode (ES) or the exposure meter value of the aperture opening in a diaphragm control mode (EE), comprising:
(a) a finder viewing field,
(b) a single, elongated, electro-optical element disposed in said viewing field at one side thereof,
(c) side-by-side shutter speed (Tv) and diaphragm (Av) scales disposed thereon,

(d) both of said scales being disposed closely adjacent each other on the electro-optical element, (e) a single column of illuminable indicator dots selectively energizable in response to the exposure meter output disposed closely adjacent one of the scales, laterally aligned with the indicia of both scales, and operably shared in common with both scales, (f) characters E, OVER and UNDER fixedly inscribed on the electro-optical element and shared in common by both of said scales, and (g) said scales being relatively longitudinally offset such that the lateral sum of aligned numerals in both scales never exceeds four, whereby the overall width of the electro-optical element is minimized.

2. A finder display as defined in claim 1, wherein the electro-optical element is a liquid crystal cell.

* * * * *